(12) United States Patent
Lombardini

(10) Patent No.: US 11,491,698 B2
(45) Date of Patent: Nov. 8, 2022

(54) SYSTEM AND METHOD FOR REDUCING DRAW RESONANCE IN PLANTS FOR THE PRODUCTION OF PLASTIC FILM

(71) Applicant: Colines S.p.A., Novara (IT)

(72) Inventor: Nicola Lombardini, Oleggio (IT)

( * ) Notice: Subject to any disclaimer, the term of this patent is extended or adjusted under 35 U.S.C. 154(b) by 25 days.

(21) Appl. No.: 17/247,610

(22) Filed: Dec. 17, 2020

(65) Prior Publication Data

US 2021/0107201 A1   Apr. 15, 2021

Related U.S. Application Data

(63) Continuation of application No. 15/477,094, filed on Apr. 2, 2017, now Pat. No. 10,889,045.

(30) Foreign Application Priority Data

Apr. 7, 2016 (IT) .......................... 102016000035587

(51) Int. Cl.
*B29C 48/88* (2019.01)
*B29C 48/92* (2019.01)
*B29C 48/08* (2019.01)

(52) U.S. Cl.
CPC ........ *B29C 48/9175* (2019.02); *B29C 48/914* (2019.02); *B29C 48/92* (2019.02); *B29C 48/08* (2019.02); *B29C 2948/92209* (2019.02); *B29C 2948/92571* (2019.02)

(58) Field of Classification Search
CPC ....... B29C 48/88; B29C 48/91; B29C 48/908; B29C 48/914; B29C 48/911; B29C 48/002; B29C 48/08; B29C 48/92; B29C 48/906; B29C 2948/92209; B29C 2948/92571; B29C 2948/92104; B29C 2948/92428; B29C 2948/92923
See application file for complete search history.

(56) References Cited

U.S. PATENT DOCUMENTS

| | | | | |
|---|---|---|---|---|
| 4,105,386 A | * | 8/1978 | Thiel .................... | B29C 48/914 425/327 |
| 4,486,377 A | * | 12/1984 | Lucchesi ............... | B29C 48/911 264/237 |
| 4,608,221 A | * | 8/1986 | Kurtz .................... | B29C 48/08 264/171.23 |
| 4,668,463 A | * | 5/1987 | Cancio .................. | B29C 48/911 425/72.1 |

FOREIGN PATENT DOCUMENTS

EP        2431153 A2 *  3/2012  ......... B29C 48/0017

* cited by examiner

*Primary Examiner* — Jerzi H Moreno Hernandez
(74) *Attorney, Agent, or Firm* — Themis Law

(57) ABSTRACT

A system and method for reducing draw resonance of a plastic material in molten state, so-called melt, leaving an extrusion group of a plant for the production of plastic film, includes at least one thermostatically-controlled cylinder, having an embracement angle of the melt on the cylinder that is adjustable on the basis of the process rate, i.e., the linear movement speed of the plastic film, and/or on the basis of the temperature measured in the proximity of or in correspondence with the clamping area of the melt in a thermoforming, calibration and cooling group included in the plant and positioned downstream of the system.

4 Claims, 3 Drawing Sheets

SYSTEM AND METHOD FOR REDUCING DRAW RESONANCE IN PLANTS FOR THE PRODUCTION OF PLASTIC FILM

FIELD OF THE INVENTION

The present invention relates to a system and a method for reducing the draw resonance in extrusion plants having the cast technology for the production of plastic film.

BACKGROUND OF THE INVENTION

It is known that in plants with cast technology, downstream of one or more single-screw or twin-screw extruders, there is at least one cooling group, typically but not exclusively composed of one or more cylinders, cooled or thermoregulated by means of any carrier fluid (water, oil, air, etc.), either inside or outside the cylinder itself. The extruded plastic film comes into contact with said cooling group after passing a longer or shorter section "in air", free, i.e., without any contact with any other element of the production line.

This section "in air" is covered with the molten mass of plastic material still in melt form, i.e., without any specific form and with the possibility of being geometrically deformed, in each of the three directions, by the application of forces even of an extremely slight entity.

This causes the specific form of the melt to also be influenced by external elements such as air currents, surface irregularities of the melt itself, etc., in addition to considerably amplifying the consequences of possible defects in thickness.

The very nature of the melt makes it practically impossible to apply a constant tension, i.e., any tension that is applied cannot be transmitted homogeneously.

The consequence of this behavior of the melt is so-called "draw resonance" i.e., a vibration/resonance caused by a continuous variation in the geometry of the melt induced by the non-homogeneous cooling of the melt in said section "in air", in turn caused by the tension generated by the cooling group situated immediately downstream of the extrusion elements.

Draw resonance is a phenomenon which is particularly harmful for the quality of the plastic film produced in the plant.

This phenomenon is basically present regardless of the type of polymer extruded, whether it be of a polyethylene or polypropylene matrix, or based on polyamide or polystyrene, or containing organic or inorganic fillers such as calcium carbonate or glass fiber.

This occurs because this phenomenon is not related to the crystallization process (in turn greatly characterized by the type of polymer used), but is due to the geometry of the system, i.e., the type of technology adopted for the production of plastic film.

Draw resonance is also evident in extrusion plants that use the blown technology, wherein the whole cooling process of the film is effected "in air", therefore without the use of any cooling means by contact, the phenomenon however is enormously amplified in plants with the cast technology as:

in the case of lines based on the blown technology, the rate of the process (i.e., the linear movement speed of the plastic film) is, at best, close to or slightly higher than 200 m/min, whereas in lines based on the cast technology the rate of the production line is well over 300 m/min, and in some cases even 400 m/min;

in the case of plants based on the blown technology, the extruded melt in any case has a continuous form (commonly called "balloon"), which allows a perfect symmetry of the internal tensions, also when the same are extremely weak, as the polymer is still in the molten state, whereas in the case of production lines based on the cast technology, on the contrary, in addition to the problems indicated above, there is also a significant asymmetry of the extruded film, which, in the extrusion direction, has two edges inevitably subjected to forces different from the rest of the film itself, and tending towards the center of the same (i.e. the so-called "neck-in" effect).

Typical examples of production lines based on the cast technology in which the draw resonance phenomenon has a fundamental role in limiting the production capacity, are the so-called "coating" lines, in which the melt is poured directly onto the surface of one or two external elements such as paper, fabrics, aluminum or other polymers, and simultaneously passes through a so-called "clamping", i.e. two cylinders thermoregulated with any carrier fluid in contact with each other, so as to ensure the joining of said melt with the above-mentioned external elements.

The merging of said melt with the external elements must take place under well-defined thermal conditions, i.e., the temperature of the melt at the moment of merging must be high enough to ensure the correct chemical reaction between the molecules of the various elements involved, but at the same time must be sufficiently low as to allow an adequate regulation and management of the layer of melt that is being deposited on said elements.

Another typical and very common case in which the draw resonance phenomenon has an even more marked importance which is limiting for production, is that of so-called "melt embossed" lines.

In practice, in these production lines, the melt is poured directly into the so-called "clamping", as in the case previously described, in which the first cylinder consists of a metallic element (typically steel) with a particular surface design, so-called "matte coating" or "embossing" or "pattern" produced with a wide variety of surface machining methods (spark erosion, machining by chip removal, blasting, etc.), whereas the second cylinder has a surface with a rubber coating, of the most varied quality (silicone rubber, polyurethane, etc.), and is pressed against the first cylinder by means of any contact system (pneumatic, hydraulic, electronic, or any other).

The "melt embossed" process therefore consists in permanently deforming a surface of the final film, but possibly both surfaces, by means of a mechanical deformation action ensured by the thrust of the rubberized surface, and therefore deformable, of the second cylinder against the rigid and substantially non-deformable surface of the first cylinder, simultaneously also effecting the final cooling of the film so as to make the deformation effective, which, in the case of excessive temperature of the melt, would otherwise be "cancelled" by the elastic return.

The final film thus acquires the same form as the surface of the so-called embossed cylinder, and can therefore have the most varied forms (pyramid, cone, semispherical, etc.).

This technology is basically (but not exclusively) used in the field of hygiene applications (e.g., diapers for children and adults), as this surface gives the plastic film a tactile and visual characterization that makes it resemble a fabric, with beneficial effects on the sensation of whoever is using the end-product.

As in the case of so-called "coating" production lines, the definition and management of the temperature of the melt at the moment in which the embossing is effected, is extremely important also for "melt embossed" lines, due to the necessity of applying a permanent deformation, which can only be such if it is carried out at a temperature close to the Vicat value. As the cooling of the plastic film, from the extrusion temperature (indicatively but not exclusively around 200-250° C.) up to a value close to the Vicat temperature (which, depending on the type of polymer used, can indicatively range from less than 100° C. to over 150° C.), is only ensured by the section "in air" along which the melt passes from the outlet of the extrusion die to the "clamping" between the two cylinders, it is obvious that with an increase in the production rate, this distance must currently also be increased, so as to give the melt time for lowering its temperature to the desired value.

This operation, which is extremely simple from a mechanical point of view, as it basically amounts to adequately dimensioning the geometry of the area of the extrusion die and the casting and "clamping" group, involves, however, a series of drawbacks and problems which effectively limit the maximum production rate that can be reached with this type of plant. This operation in fact causes:

an exponential increase in the so-called "neck-in effect" (i.e., the narrowing of the width of the falling melt due to the Van-der-Waals intermolecular forces which tend to bring the molecules together until they acquire a form having a lower potential) which entails the necessity of considerably increasing the width of the extrusion die with an increase in the production rate in order to reach the same final width of the film;

a greater sensitivity of the falling melt to any type of external factor (air currents, heat sources, etc.), due to the larger surface exposed;

the onset, above all, of an evident draw resonance.

Various solutions are known in the state of the art for cooling the melt, which, however, do not guarantee an adequate constancy and control of the temperature of the melt, such as, for example, an air blow that meets the melt in the free section in which there is no contact with the elements of the production line.

Although this solution offers advantages, it has the drawback of not allowing accurate and repeatable adjustments, leaving the success of the production of plastic film up to the operator's experience.

Document U.S. Pat. No. 4,608,221 describes a process for reducing the "draw resonance" phenomenon in which the film or strip, before reaching the two cooled "clamping" cylinders, slides on the arched surface of a cylinder of a tensioning device, which can be moved so that the tension on the film remains approximately constant. This is obtained with a substantially friction-free surface, thanks to the choice of material (for example Teflon) or preferably with a surface on which air, steam or another fluid is directed, which prevents contact between the strip or film and the surface of the cylinder.

The tensioning device is positioned so that the surface, free of friction, exerts a tensioning effect in the width direction against the moving strip, in a point between the extrusion and the cooling area.

The cylinder extends in the width direction of the strip and has a portion of its surface, adjacent to the strip, which is permeable, so that the air (or another fluid), entering the cylinder, can exit and be used for keeping the molten strip separated for at least about 0.1 inch, from the solid surface of the cylinder. The fluid leaves the surface of the cylinder at such a rate as to avoid causing distortions but only a cushioning effect. In this way, the strip and the cylinder can be moved simultaneously, in a direction towards or away from a certain position, according to an increase or decrease in the tension of the strip, so that fluctuations in the tension can be amortized.

The tensioning device is provided with a counterweight, a spring or the like, which allow an appropriate tension of the cylinder with the molten strip to be maintained in order to reduce the occurrence of the "draw resonance" phenomenon.

The method described above therefore provides for reducing the draw resonance by simply amortizing the movements of the strip which is moving from the extruder towards the thermoforming and cooling area.

SUMMARY OF THE INVENTION

The general objective of the present invention is to provide a system and method for an extrusion plant of film made of plastic material, that allows the regulation and accurate management of the temperature of the melt in correspondence with the "clamping" cylinders, in order to avoid the drawbacks described above and allow not only an increase in performance of the production lines but also a greater constancy and, ultimately, a higher quality of the film produced.

In particular, the objective of the present invention is to provide a system and a method which reduces the draw resonance phenomenon in production plants of plastic film, in particular cast technology plants.

An object of the present invention therefore relates to a system and a method for reducing the draw resonance of plastic material in the molten state, so-called melt, leaving an extrusion group of a plant for the production of plastic film wherein said system comprises at least one thermostatically-controlled cylinder, having an angle of embracement (sometimes called a looping angle or a winding angle) of the melt on said cylinder, adjustable on the basis of the process rate, i.e. the linear movement speed of the plastic film and/or on the basis of the temperature measured in the proximity of or in correspondence with the clamping area of said melt in a thermoforming, calibration and cooling group included in said plant and positioned downstream of said apparatus.

An object of the present invention also relates to a plant, in particular a cast plant for the formation of film made of plastic material comprising said system for reducing the draw resonance.

BRIEF DESCRIPTION OF THE DRAWINGS

The structural and functional characteristics of the present invention and its advantages with respect to the known art will appear even more evident from the following description, referring to the enclosed schematic drawings, which show an embodiment example of the same invention.

In the drawings.

DETAILED DESCRIPTION OF EMBODIMENTS OF THE INVENTION

Figure 1:
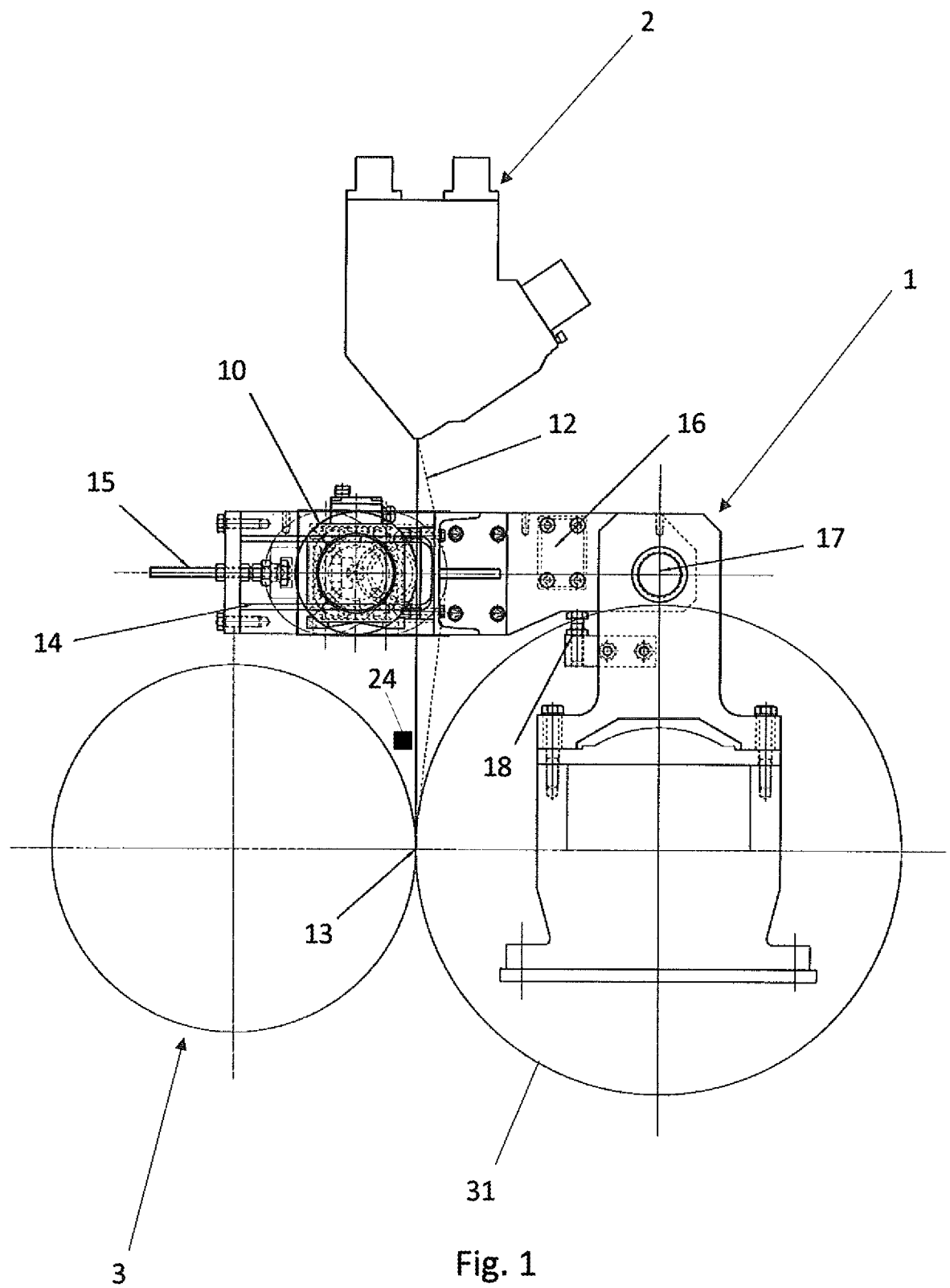
FIG. 1 is a transversal section of an extrusion plant of plastic film provided with a system according to the present invention.

With reference to the figures, FIG. 1 shows an extrusion plant for the production of film made of plastic material comprising at least one extrusion group 2 and, downstream of said extrusion group 2, at least one thermoforming, calibration and cooling group 3, for the formation of a mono- or multi-layer film.

According to the present invention, said plant is provided with a system 1 for the temperature regulation of the melt positioned upstream of said at least one thermoforming, calibration and cooling group 3.

Said apparatus can be provided in plants with a flat-die extrusion technology (cast film).

The system 1 object of the present invention, which allows a reduction in the draw resonance of the plastic material in the molten state, so-called melt 12, leaving an extrusion group 2 of a plant for the production of plastic film comprises at least one thermostatically-controlled cylinder 10, having an embracement angle A, of the melt 12, falling from the extrusion group 2 onto said cylinder 10, adjustable on the basis of the process rate, i.e. the linear movement speed of the plastic film and/or on the basis of the temperature measured in the proximity of or in correspondence with the clamping area 13 of said melt 12 in a thermoforming, calibration and cooling group 3 included in said plant and positioned downstream of said system 1.

Said cylinder 10 is preferably made of steel.

According to an embodiment, the temperature regulation of the cylinder 10 is effected through a heat-transfer fluid in the liquid state, such as water, oil or the like, conveyed by a rotating joint 11, positioned coaxially inside said cylinder 10.

Alternatively, the regulation of the surface temperature of the cylinder 10 can be effected by means of a heat-transfer fluid in the gaseous state.

Figure 2:
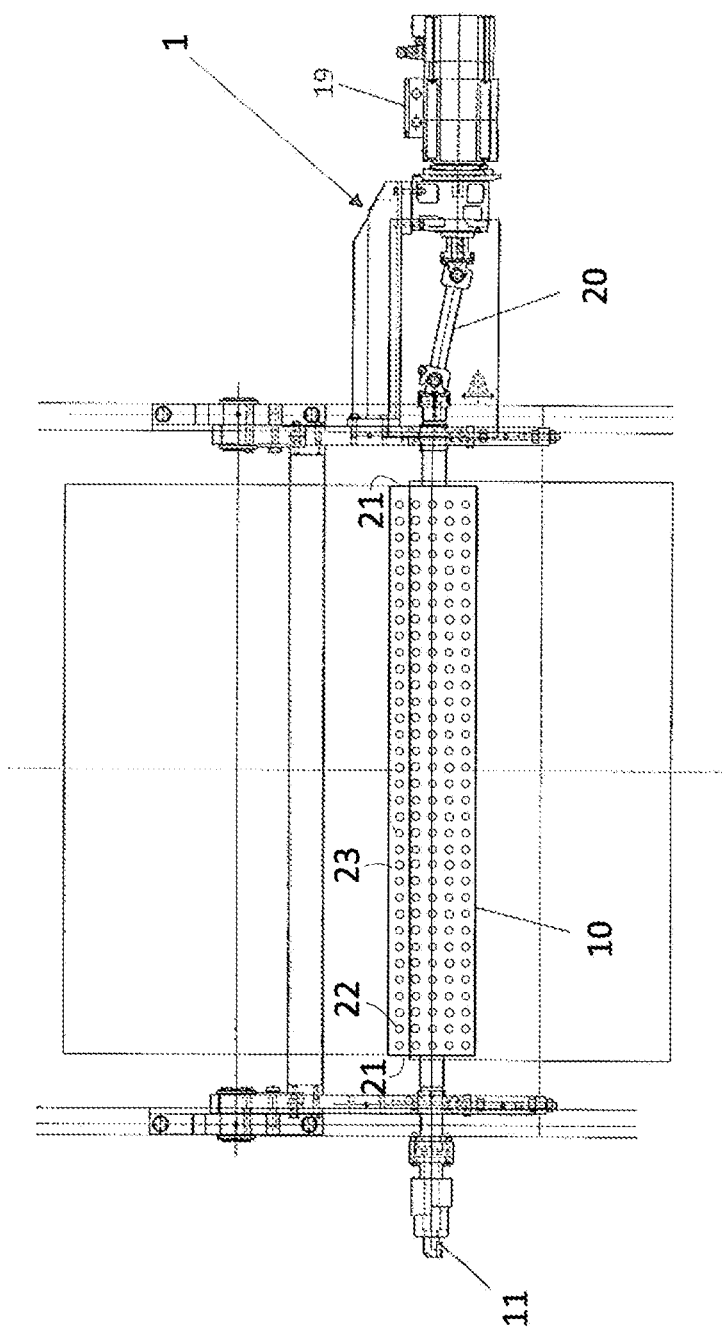
FIG. 2 is a longitudinal section of a system according to the present invention.

The blowing of air or steam inside the cylinder 10 can be provided, using any suitable means, such as a compressor or fan, creating a flow with an adjustable temperature and flow-rate, as said cylinder 10 is provided on at least part of the mantle 23 with holes 22 (shown representatively in FIG. 2 on a portion of the mantle 23) for the outflow of said air or steam.

The blowing of air or steam can be effected from one or both of the bases 21 of said cylinder 10, to be discharged from the holes 22 directly against the surface of the melt 12 falling from the extrusion group 2, thus causing a controlled cooling thereof and consequently eliminating the "draw resonance" phenomenon.

The flow of fluid, such as oil, water or the like, allows the surface temperature regulation of the cylinder 10 in an operating range that can vary from 10° C. to 200° C.

The system 1 comprises regulation means of the horizontal movement and/or regulation means of the angular movement of said cylinder 10.

Said embracement angle A can be varied:

by means of a horizontal movement within guides 14 secured by a pair of adjustment screws 15, by means of an angular movement by rotation of the supporting levers 16 of the cylinder 10 around a fulcrum 17, by means of a second pair of adjustment screws 18.

The combination of the horizontal and angular movements allows the embracement angle A of the melt 12 on the cylinder 10 to be consistently varied.

Figure 3:
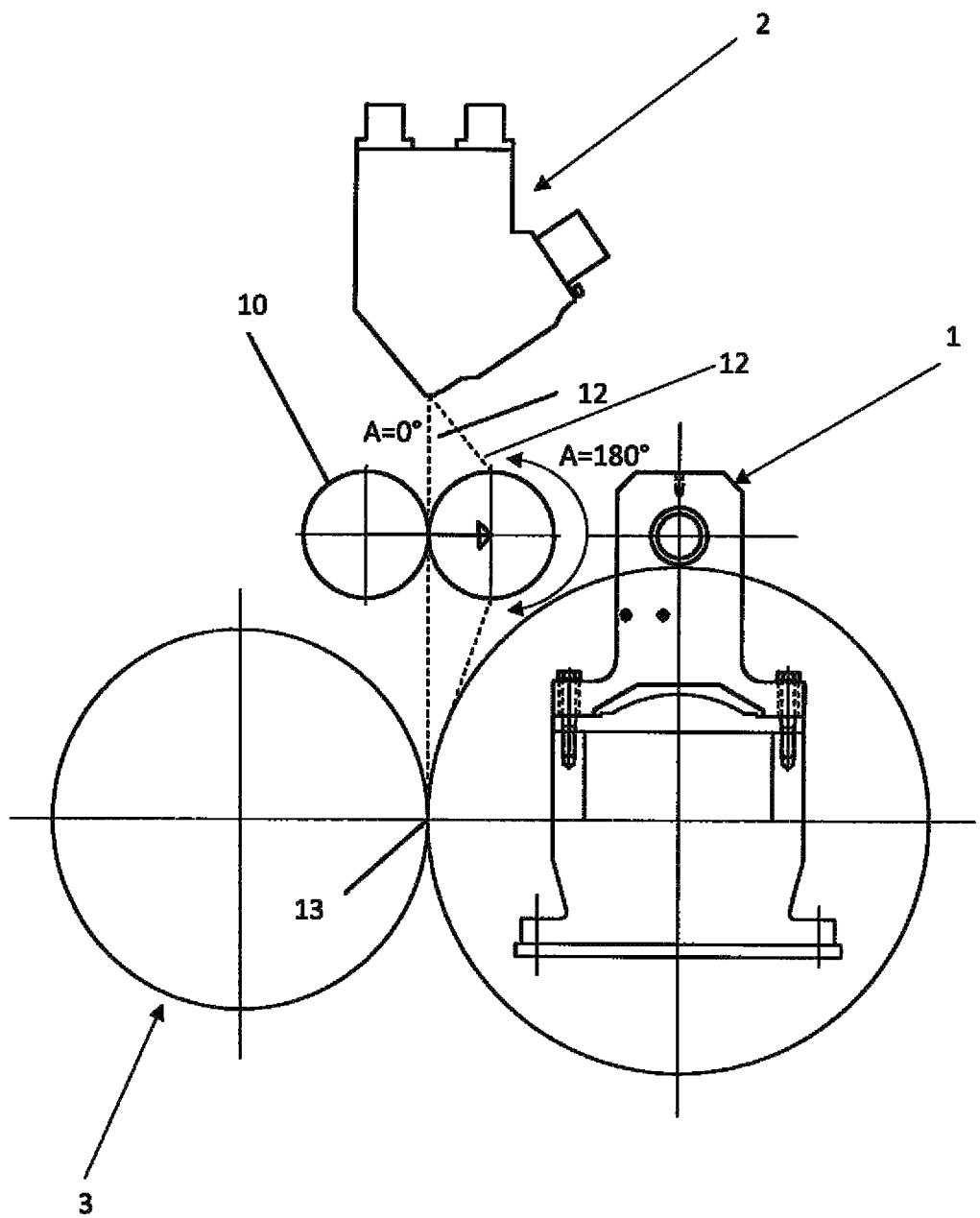
FIG. 3 is a transversal section of an extrusion plant of plastic film provided with a system according to the present invention illustrating the two limit positions for the embracement angle of the thermostatically-controlled cylinder.

As illustrated in FIG. 3, the embracement angle A can be preferably varied from 0° (no contact) up to about 180°.

The variation in the embracement angle A and the management of the surface temperature of said cylinder 10 therefore ensures, with great accuracy, the management of the temperature of the melt 12 at the moment of clamping 13, as it allows heat to be supplied or removed.

Said cylinder can be either rotating or non-rotating.

The motorization of the cylinder 10 is ensured by an external motorization 19 connected to the same cylinder 10, preferably but not exclusively, by means of a universal joint 20, which guarantees the management of the rate of the cylinder 10 independently of the other rotating elements, forming the extrusion and production line of plastic film.

This motorization can in any case also be adopted for other rotating elements of the extrusion and production line of plastic film, such as one or both cylinders forming the clamping 13, by means of transmission belts or any other known movement transmission system.

As an alternative to a rotating cylinder 10 and therefore motorized, a non-rotating cylinder 10, and therefore fixed, can be provided, but whose position can be equally adjusted analogously to what is described above.

According to an embodiment, a non-rotating cylinder can be provided, thermoregulated by means of an air flow: this embodiment avoids the use of both the motor 19 and the consequent universal joint 20, and also the hydraulic joint 11 for the passage of the carrier fluid, reducing the cylinder 10 to a kind of "tube" through which air passes, blown by a fan, a compressor or any other system suitable for creating a well-defined flow of air, whose flow-rate and temperature can be regulated.

An object of the present invention also relates to a plant for the production of film made of plastic material comprising:

at least one extrusion group 2;

at least one thermoforming, calibration and cooling group 3;

downstream of said at least one extrusion group 2, at least a system 1 for reducing the draw resonance of the plastic material in the molten state, so-called melt 12, leaving an extrusion group 2 produced as described above.

The plant is preferably a plant for the formation of flat-die film, a so-called cast film plant.

According to the present invention, a detection sensor of the temperature of the melt 12 is provided in correspondence with or in the proximity of the clamping area 13.

The temperature of the melt 12 is measured with great accuracy by means of a temperature sensor 24 which exploits the known infrared technology, or using any other detection system; said temperature measurement is therefore used as reference for:

managing the embracement angle A of the cylinder 10 with the melt 12;

regulating the temperature of the cylinder 10 by adjustment of the temperature and/or flow-rate of the cooling fluid.

A further object of the present invention relates to a method for reducing the draw resonance of plastic material in the molten state, so-called melt 12, leaving an extrusion group 2 of a plant for the production of plastic film wherein, between the extrusion step of the melt 12 and the clamping step 13 effected by at least one thermoforming, calibration and cooling group 3 of the plant, there is a temperature regulation phase of the melt 12 effected through the passage of said melt 12 over at least one thermostatically-controlled cylinder 10, having an embracement angle A, of the melt 12 on said cylinder 10, adjustable on the basis of the process rate, i.e. the linear movement speed of the plastic film and/or on the basis of the temperature measured in the proximity of or in correspondence with the clamping area 13 of said melt 12.

The forms of the structure for implementing the system and method of the present invention, as also the materials and assembly modes, can naturally differ from those shown for purely illustrative and non-limiting purposes in the drawings.

The protection scope of the present invention is defined by the enclosed claims.

The invention claimed is:

1. A method of reducing draw resonance of a melt of a plastic material, leaving an extrusion group of a plant for production of a plastic film, comprising:
    regulating a temperature of the melt, after extruding the melt and before clamping by a thermoforming, calibration and cooling group of the plant, by causing passage of the melt over a thermostatically-controlled cylinder, the thermostatically-controlled cylinder having an embracement angle of the melt thereon that is adjustable based on one or more of:
        process rate, the process rate comprising a linear movement speed of the plastic film, or temperature of the melt measured in proximity of or in correspondence with a clamping area of the melt; and
    a step of regulating a temperature of the thermostatically-controlled cylinder using a heat-transfer fluid in gaseous state that flows from one or both bases of the thermostatically-controlled cylinder and exits from holes provided on at least part of a mantle of the thermostatically-controlled cylinder,
    wherein regulating the temperature of the thermostatically-controlled cylinder comprises adjusting a temperature of the thermostatically-controlled cylinder between 10 and 200° C. and a flow rate of the heat-transfer fluid.

2. The method according to claim 1, further comprising a step regulating a horizontal movement of the thermostatically-controlled cylinder.

3. The method according to claim 1, further comprising a step regulating an angular movement of the thermostatically-controlled cylinder.

4. The method according to claim 1, wherein the thermostatically-controlled cylinder is rotating or non-rotating.

* * * * *